(12) United States Patent
Tyler et al.

(10) Patent No.: US 10,794,650 B2
(45) Date of Patent: Oct. 6, 2020

(54) COMPOSITE SPORTING EQUIPMENT

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites, Coeur d'Alene, ID (US)

( * ) Notice: Subject to any disclaimer, the term of this patent is extended or adjusted under 35 U.S.C. 154(b) by 261 days.

(21) Appl. No.: 15/880,049

(22) Filed: Jan. 25, 2018

(65) Prior Publication Data
US 2018/0229100 A1 Aug. 16, 2018

Related U.S. Application Data

(60) Provisional application No. 62/458,328, filed on Feb. 13, 2017.

(51) Int. Cl.
G21F 3/02 (2006.01)
F41A 21/02 (2006.01)
(Continued)

(52) U.S. Cl.
CPC .............. F41A 21/02 (2013.01); A63B 49/00 (2013.01); A63B 49/02 (2013.01); A63B 49/10 (2013.01); A63B 53/10 (2013.01); A63B 53/14 (2013.01); A63B 60/00 (2015.10); A63B 60/08 (2015.10); A63B 60/42 (2015.10); A63B 71/0622 (2013.01); A63B 71/12 (2013.01); A63C 5/052 (2013.01); A63C 5/06 (2013.01); A63C 5/075 (2013.01); A63C 5/12 (2013.01); A63C 11/003 (2013.01); B29C 64/165 (2017.08); B29C 70/08 (2013.01); B29C 70/382 (2013.01); B29C 70/384 (2013.01); B29C 70/70 (2013.01); B29C 70/72 (2013.01); B29C 70/86 (2013.01); B33Y 10/00 (2014.12); D03D 3/02 (2013.01); F41A 3/66 (2013.01); F41A 21/18 (2013.01); F41C 23/18 (2013.01); G01L 5/0052 (2013.01);
(Continued)

(58) Field of Classification Search
CPC .............. A41D 13/015; A41D 13/0518; A41D 13/0512; A63B 2071/1208
USPC .......................................................... 2/455
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
DE 102006035274 A1 2/2008
(Continued)

OTHER PUBLICATIONS

International Search Report dated Apr. 19, 2018 for PCT/US2018/015353 to CC3D LLC Filed Jan. 26, 2018.
(Continued)

Primary Examiner — Timothy K Trieu
(74) Attorney, Agent, or Firm — Ryan C. Stockett

(57) ABSTRACT

A sporting equipment is disclosed. The sporting equipment may include a harness, and a protective plate. The protective plate may be integrally formed with the harness from a plurality of fibers that are continuous from the harness into the protective plate.

20 Claims, 2 Drawing Sheets

(51) Int. Cl.
| | |
|---|---|
| *F41C 23/18* | (2006.01) |
| *B29C 70/72* | (2006.01) |
| *A63B 60/08* | (2015.01) |
| *F41A 3/66* | (2006.01) |
| *F41A 21/18* | (2006.01) |
| *B29C 70/38* | (2006.01) |
| *B29C 70/86* | (2006.01) |
| *A63B 49/00* | (2015.01) |
| *B29C 70/70* | (2006.01) |
| *A63B 53/10* | (2015.01) |
| *A63B 60/00* | (2015.01) |
| *A63B 60/42* | (2015.01) |
| *A63C 5/075* | (2006.01) |
| *A63B 49/02* | (2015.01) |
| *A63B 49/10* | (2015.01) |
| *A63B 53/14* | (2015.01) |
| *B33Y 10/00* | (2015.01) |
| *B29C 64/165* | (2017.01) |
| *A63B 71/06* | (2006.01) |
| *A63C 5/052* | (2006.01) |
| *A63C 5/06* | (2006.01) |
| *A63C 5/12* | (2006.01) |
| *A63C 11/00* | (2006.01) |
| *A63B 71/12* | (2006.01) |
| *B29C 70/08* | (2006.01) |
| *D03D 3/02* | (2006.01) |
| *G01L 5/00* | (2006.01) |
| *B29L 31/52* | (2006.01) |
| *B29C 70/88* | (2006.01) |
| *A63B 102/22* | (2015.01) |
| *A63B 102/24* | (2015.01) |
| *A63B 102/34* | (2015.01) |
| *A63B 24/00* | (2006.01) |
| *B33Y 80/00* | (2015.01) |
| *B29K 105/08* | (2006.01) |
| *B29K 707/04* | (2006.01) |
| *B29K 709/08* | (2006.01) |
| *B29L 31/48* | (2006.01) |

(52) U.S. Cl.
CPC ............ *A63B 24/0062* (2013.01); *A63B 71/06* (2013.01); *A63B 2071/0658* (2013.01); *A63B 2102/22* (2015.10); *A63B 2102/24* (2015.10); *A63B 2102/34* (2015.10); *A63B 2207/02* (2013.01); *A63B 2208/03* (2013.01); *A63B 2209/00* (2013.01); *A63B 2209/023* (2013.01); *A63B 2220/51* (2013.01); *A63B 2220/54* (2013.01); *A63B 2220/805* (2013.01); *A63B 2244/18* (2013.01); *A63B 2244/19* (2013.01); *A63C 2203/14* (2013.01); *A63C 2203/18* (2013.01); *B29C 70/88* (2013.01); *B29K 2105/08* (2013.01); *B29K 2677/10* (2013.01); *B29K 2707/04* (2013.01); *B29K 2709/08* (2013.01); *B29K 2995/0063* (2013.01); *B29K 2995/0082* (2013.01); *B29L 2031/48* (2013.01); *B29L 2031/52* (2013.01); *B33Y 80/00* (2014.12); *D10B 2101/06* (2013.01); *D10B 2101/12* (2013.01); *D10B 2331/02* (2013.01); *D10B 2401/061* (2013.01); *D10B 2401/062* (2013.01); *D10B 2403/02* (2013.01); *D10B 2501/00* (2013.01); *D10B 2507/00* (2013.01)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,839,777 A * | 6/1989 | Janko ............... A41D 27/085 362/103 |
| 4,851,065 A | 7/1989 | Curtz |
| 5,002,712 A | 3/1991 | Goldmann et al. |
| 5,037,691 A | 8/1991 | Medney et al. |
| 5,070,436 A * | 12/1991 | Alexander ............ A41D 13/01 340/321 |
| 5,296,335 A | 3/1994 | Thomas et al. |
| 5,340,433 A | 8/1994 | Crump |
| 5,530,966 A | 7/1996 | West |
| 5,590,908 A | 1/1997 | Carr |
| 5,746,967 A | 5/1998 | Hoy et al. |
| 5,775,715 A | 7/1998 | Vandergrift |
| 5,809,861 A | 9/1998 | Hummel |
| 5,866,058 A | 2/1999 | Batchelder et al. |
| 5,936,861 A | 8/1999 | Jang et al. |
| 6,153,034 A | 11/2000 | Lipsker |
| 6,286,145 B1 * | 9/2001 | Welchel ................ A41D 31/02 2/69 |
| 6,341,384 B1 * | 1/2002 | Hayes .................... A41D 27/02 2/458 |
| 6,381,482 B1 | 4/2002 | Jayaraman et al. |
| 6,459,069 B1 | 10/2002 | Rabinovich |
| 6,501,554 B1 | 12/2002 | Hackney et al. |
| 6,595,938 B1 | 7/2003 | Delmore et al. |
| 6,769,138 B2 * | 8/2004 | Golle ...................... A41D 1/04 2/102 |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,043,766 B1 | 5/2006 | Foreman et al. |
| 7,080,849 B2 | 7/2006 | Lammer |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2001/0001770 A1 | 5/2001 | Spangler et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0192351 A1 | 10/2003 | Meckley et al. |
| 2003/0236588 A1 | 12/2003 | Jang et al. |
| 2004/0019950 A1 | 2/2004 | Rast |

(56) References Cited

U.S. PATENT DOCUMENTS

| | | |
|---|---|---|
| 2004/0128747 A1* | 7/2004 | Bumbarger ............... A45F 3/20 2/458 |
| 2005/0006803 A1 | 1/2005 | Owens |
| 2005/0061422 A1 | 3/2005 | Martin |
| 2005/0073834 A1* | 4/2005 | Langley ................. A41D 13/01 362/108 |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0150254 A1 | 6/2008 | Inge |
| 2008/0176092 A1 | 7/2008 | Owens |
| 2009/0095410 A1 | 4/2009 | Oldani |
| 2009/0188017 A1* | 7/2009 | Kruse .................. A41D 31/085 2/81 |
| 2010/0093241 A1* | 4/2010 | Medoff ............... D06M 10/008 442/181 |
| 2010/0100997 A1* | 4/2010 | Lee .................... H01R 13/2407 2/69 |
| 2010/0122832 A1* | 5/2010 | Bukshpun .............. A41D 1/005 174/110 R |
| 2010/0162604 A1 | 7/2010 | Dubois |
| 2010/0190586 A1 | 7/2010 | House |
| 2011/0032301 A1 | 2/2011 | Fienup et al. |
| 2011/0070968 A1 | 3/2011 | Stites |
| 2011/0136602 A1 | 6/2011 | Hsu et al. |
| 2011/0143108 A1 | 6/2011 | Fruth et al. |
| 2012/0060468 A1 | 3/2012 | Dushku et al. |
| 2012/0115631 A1 | 5/2012 | Tseng et al. |
| 2012/0159785 A1 | 6/2012 | Pyles et al. |
| 2012/0231225 A1 | 9/2012 | Mikulak et al. |
| 2012/0233740 A1 | 9/2012 | Veillet |
| 2012/0247655 A1 | 10/2012 | Erb et al. |
| 2012/0276309 A1 | 11/2012 | Failing |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0020192 A1 | 1/2014 | Jones et al. |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0297973 A1 | 10/2015 | Beers |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0258713 A1 | 9/2016 | Huang et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0341517 A1 | 11/2016 | Williams |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 2589481 B1 | 1/2016 |
| EP | 3219474 A1 | 9/2017 |
| EP | 3231488 A1 | 10/2017 |
| KR | 100995983 B1 | 11/2010 |

(56) References Cited

FOREIGN PATENT DOCUMENTS

| | | |
|---|---|---|
| KR | 101172859 B1 | 8/2012 |
| WO | 2005047801 A2 | 5/2005 |
| WO | 2008149183 A1 | 12/2008 |
| WO | 2013017284 A2 | 2/2013 |
| WO | 2016088042 A1 | 6/2016 |
| WO | 2016088048 A1 | 6/2016 |
| WO | 2016092132 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, Uv Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

\* cited by examiner

COMPOSITE SPORTING EQUIPMENT

RELATED APPLICATIONS

This application is based on and claims the benefit of priority from U.S. Provisional Application No. 62/458,328 that was filed on Feb. 13, 2017, the contents of which are expressly incorporated herein by reference.

TECHNICAL FIELD

The present disclosure relates generally to sporting equipment and, more particularly, to sporting equipment made from a composite material via additive manufacturing.

BACKGROUND

Unique equipment is available for most any sport. For example, a racket may be used to play tennis, a club may be used to play golf, body armor may be used for motocross, a gun may be used for skeet or biathlon events, etc. Often, a quality of the equipment used during a sporting event can affect an outcome of the event. For example, a weight of the equipment, a strength of the equipment, a shape of the equipment, a flexibility of the equipment, a hardness of the equipment, a durability of the equipment, a conformability of the equipment, etc., can directly affect an acceleration, a speed, a distance, a force, an accuracy, a repeatability, a longevity, and other performance parameters. Unfortunately, conventional manufacturing capabilities may limit the available quality of conventional sporting equipment.

Some sporting equipment is manufactured from composite materials, which can enhance the quality of the equipment. For example, the frame of a tennis racket, the handle of a golf club, and the stock of a gun have been made from fiberglass, Kevlar, and carbon fibers using a vacuum-mold technique or a pultrusion process. Thereafter, the composite components are joined to other non-composite components (e.g., to strings, a head, a grip, a barrel, an action, etc.) using conventional techniques (e.g., gluing, welding, mechanical fastening, etc.). Sporting goods made from composite materials may have a reduced weight and/or increased strength or stiffness.

Although sporting equipment having composite components may have improved qualities, the associated benefits may be limited. In particular, the quality may be interrupted because of the conventional joining techniques used to connect the composite components to the associated non-composite components. In addition, conventional vacuum-mold techniques and pultrusion processes may limit the shape, size, and/or configuration possible within the composite components. In addition, it may be beneficial, in some applications, to receive feedback from the sporting equipment; and this may not be possible using conventionally manufactured equipment.

The disclosed sporting equipment is directed to overcoming one or more of the problems set forth above and/or other problems of the prior art.

SUMMARY

In one aspect, the present disclosure is directed to a sporting equipment. The sporting equipment may include a harness, and a protective plate. The protective plate may be integrally formed with the harness from a plurality of fibers that are continuous from the harness into the protective plate.

In another aspect, the present disclosure is directed to a method of fabricating a sporting equipment. This method may include wetting a continuous fiber with a matrix, and discharging a matrix-wetted continuous fiber through a nozzle. The method may also include moving the nozzle during discharging to extend the matrix-wetted continuous fiber from a harness through a protective plate, and curing a matrix in the matrix-wetted continuous fiber.

DETAILED DESCRIPTION

Figure 1:
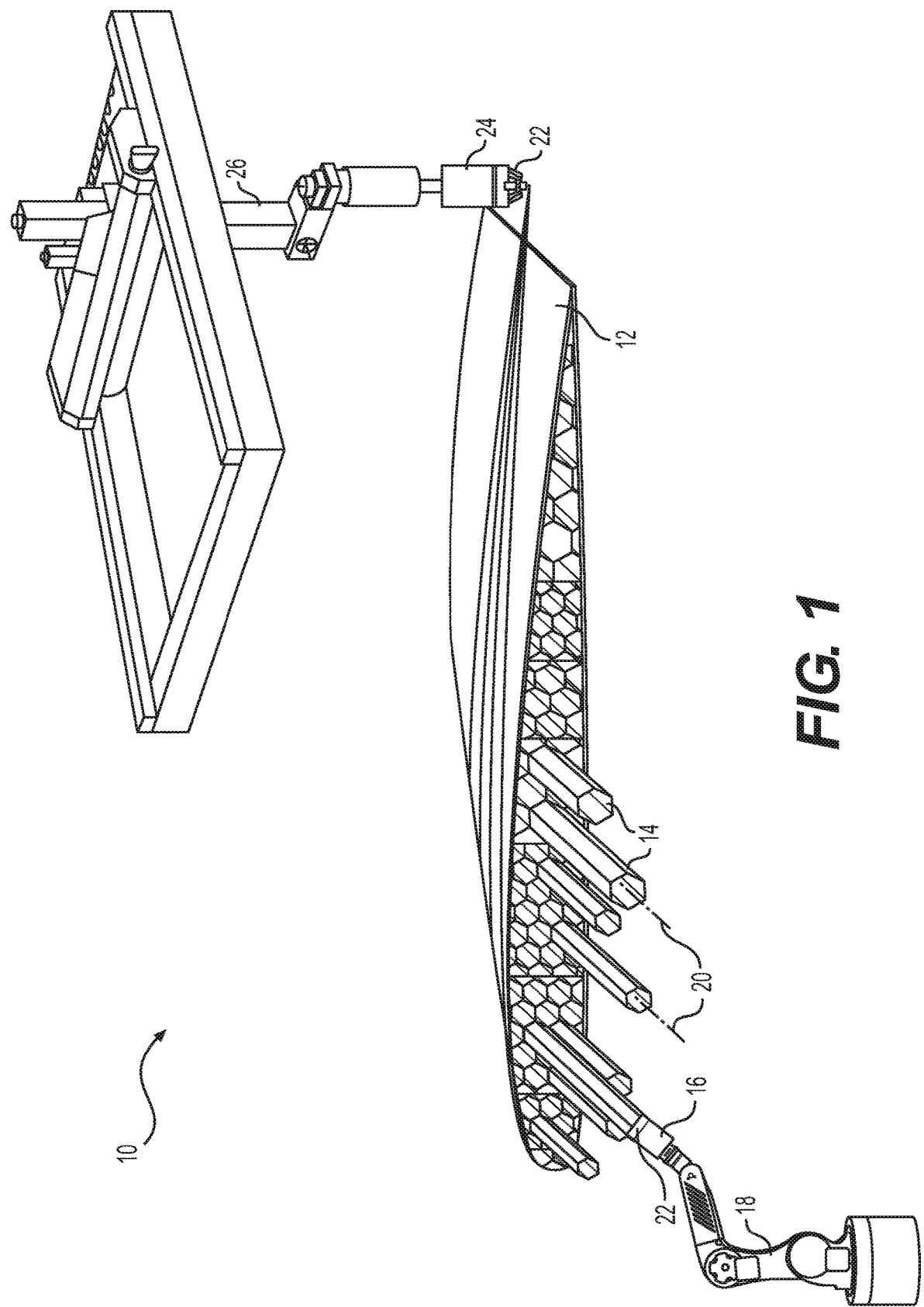
FIG. 1 is a diagrammatic illustration of an exemplary system for manufacturing sporting equipment.

FIG. 1 illustrates an exemplary system 10 for additively manufacturing sporting equipment 12. System 10 may implement any number of different additive processes during manufacture of sporting equipment 12. For example, sporting equipment 12 is shown in FIG. 1 as being manufactured via a first additive process and via a second additive process. It should be noted that the first and second additive processes may be performed simultaneously or consecutively, as desired. It should also be noted that sporting equipment 12 may be manufactured utilizing only one of the first and second additive processes.

The first additive process (represented in the lower-left of FIG. 1) may be a pultrusion and/or extrusion process, which creates hollow tubular structures 14 from a composite material (e.g., a material having a matrix and at least one continuous fiber). One or more heads 16 may be coupled to a support 18 (e.g., to a robotic arm) that is capable of moving head(s) 16 in multiple directions during discharge of structures 14, such that resulting longitudinal axes 20 of structures 14 are three-dimensional. Such a head is disclosed, for example, in U.S. patent application Ser. Nos. 15/130,412 and 15/130,207, all of which are incorporated herein in their entireties by reference.

Head(s) 16 may be configured to receive or otherwise contain the matrix material. The matrix material may include any type of liquid resin (e.g., a zero-volatile organic compound resin) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the pressure of the matrix material inside of head(s) 16 may be generated by an external device (e.g., an extruder or another type of pump) that is fluidly connected to head(s) 16 via corresponding conduits (not shown). In another embodiment, however, the pressure may be generated completely inside of head(s) 16 by a similar type of device and/or simply be the result of gravity acting on the matrix material. In some instances, the matrix material inside head(s) 16 may need to be kept cool and/or dark, in order to inhibit premature curing; while in other instances, the matrix material may need to be kept warm for the same reason. In either situation, head(s) 16 may be specially configured (e.g., insulated, chilled, and/or warmed) to provide for these needs.

The matrix material stored inside head(s) 16 may be used to coat any number of continuous fibers and, together with the fibers make up walls of composite structures 14. The fibers may include single strands, a tow or roving of several strands, or a weave of many strands. The strands may include, for example, carbon fibers, vegetable fibers, wood fibers, mineral fibers, glass fibers, metallic wires, ceramic fibers, basalt fibers, etc. The fibers may be coated with the matrix material while the fibers are inside head(s) 16, while the fibers are being passed to head(s) 16, and/or while the fibers are discharging from head(s) 16, as desired. In some embodiments, a filler material (e.g., chopped fibers) may be mixed with the matrix material before and/or after the matrix material coats the fibers. The matrix material, the dry fibers, fibers already coated with the matrix material, and/or the filler may be transported into head(s) 16 in any manner apparent to one skilled in the art. The matrix-coated fibers may then pass over a centralized diverter (not shown) located at a mouth of head(s) 16, where the resin is caused to cure (e.g., from the inside-out, from the outside-in, or both) by way of one or more cure enhancers (e.g., UV lights, ultrasonic emitters, microwave generators, infrared heaters, chillers, etc.) 22.

In embodiments where sporting equipment 12 is made up of multiple structures 14, each structure 14 may be discharged adjacent another structure 14 and/or overlap a previously discharged structure 14. In this arrangement, subsequent curing of the liquid resin within neighboring structures 14 may bond structures 14 together. Any number of structures 14 may be grouped together and have any trajectory, shape, and size required to generate the desired shape of sporting equipment 12.

In some embodiments, a fill material (e.g., an insulator, a conductor, an optic, a surface finish, etc.) could be deposited inside and/or outside of structures 14, while structures 14 are being formed. For example, a hollow shaft (not shown) could extend through a center of and/or over any of the associated head(s) 16. A supply of material (e.g., a liquid supply, a foam supply, a solid supply, a gas supply, etc.) could then be connected with an end of the hollow shaft, and the material forced through the hollow shaft and onto particular surfaces (i.e., interior and/or exterior surfaces) of structure 14. It is contemplated that the same cure enhancer(s) 22 used to cure structure 14 could also be used to cure the fill material, if desired, or that additional dedicated cure enhancer(s) (not shown) could be used for this purpose. The fill materials could allow one or more of structures 14 to function as tanks, passages, conduits, ducts, etc.

The second additive manufacturing process (represented in the upper-right of FIG. 1) may also be a pultrusion and/or extrusion process. However, instead of discharging hollow tubular structures 14, the second additive manufacturing process may be used to discharge tracks, ribbons, and/or sheets of composite material (e.g., over tubular structures 14 and/or over other features of sporting equipment 12). In particular, one or more heads 24 may be coupled to a support 26 (e.g., to an overhead gantry) that is capable of moving head(s) 24 in multiple directions during fabrication of sporting equipment 12, such that resulting contours of sporting equipment 12 are multi-dimensional (e.g., three-dimensional).

Head 24 may be similar to head 16 and configured to receive or otherwise contain a matrix material (e.g., the same matrix material contained within head 16 or a different matrix material). The matrix material stored inside head(s) 24 may be used to coat any number of separate fibers, allowing the fibers to make up centralized reinforcements of the discharging tracks, ribbons, and/or sheets. The fibers may include single strands, a tow or roving of several strands, or a weave of multiple strands. The strands may include, for example, carbon fibers, vegetable fibers, wood fibers, mineral fibers, glass fibers, metallic wires, etc. The fibers may be coated with the matrix material while the fibers are inside head(s) 24, while the fibers are being passed to head(s) 24, and/or while the fibers are discharging from head(s) 24, as desired. The matrix material, the dry fibers, and/or fibers already coated with the matrix material may be transported into head(s) 24 in any manner apparent to one skilled in the art. The matrix-coated fibers may then pass through one or more circular orifices, rectangular orifices, triangular orifices, or orifices of another curved or polygonal shape, where the fibers are pressed together and the matrix is caused to cure by way of one or more cure enhancers 22.

As described above, the first and second additive manufacturing processes can be extrusion or pultrusion processes. For example, extrusion may occur when the liquid matrix and the associated continuous fibers are pushed from head(s) 16 and/or head(s) 24 during the movement of supports 18 and/or 26. Pultrusion may occur after a length of matrix-coated fibers is connected to an anchor (not shown) and cured, followed by movement of head(s) 16 and/or head(s) 24 away from the anchor. The movement of head(s) 16 and/or head(s) 24 away from the anchor may cause the fibers to be pulled from the respective head(s), along with the coating of the matrix material.

In some embodiments, pultrusion may be selectively implemented to generate tension in the fibers that make up sporting equipment 12 and that remains after curing. In particular, as the fibers are being pulled from the respective head(s), the fibers may be caused to stretch. This stretching may create tension within the fibers. As long as the matrix surrounding the fibers cures and hardens while the fibers are stretched, at least some of this tension may remain in the fibers and function to increase a strength of the resulting composite structure.

Structures fabricated via conventional pultrusion methods may have increased strength in only a single direction (e.g., in the single direction in which fibers were pulled through the corresponding die prior to resin impregnation and curing). However, in the disclosed embodiment, the increased strength in sporting equipment 12 caused by residual tension within the corresponding fibers may be realized in the axial direction of each of the fibers. And because each fiber could be pulled in a different direction during discharge from head(s) 16 and/or 24, the tension-related strength increase may be realized in multiple (e.g., innumerable) different directions.

Structures fabricated via conventional pultrusion methods may have strength increased to only a single level (e.g., to a level proportionate to an amount in which the fibers were stretched by a pulling machine prior to resin impregnation and curing). However, in the disclosed embodiment, because the matrix surrounding each fiber may be cured and harden immediately upon discharge, the force pulling on the fiber may be continuously varied along the length of the fiber, such that different segments of the same fiber are stretched by different amounts. Accordingly, the residual tensile stress induced within each of the different segments of each different fiber may also vary, resulting in a variable strength within different areas of sporting equipment 12. This may be beneficial in variably loaded areas of sporting equipment 12.

Figure 2:
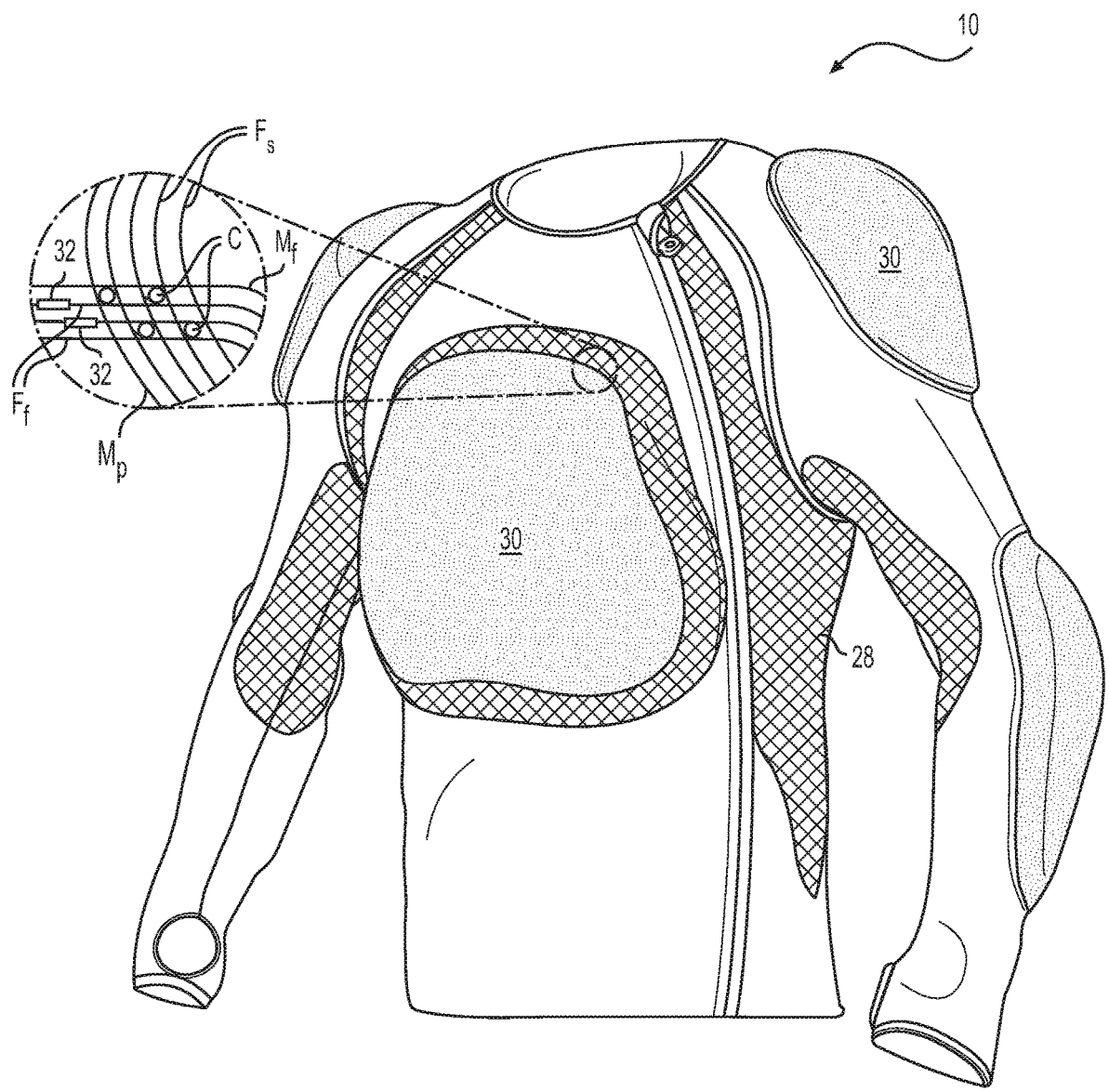
FIG. 2 is an isometric illustration of an exemplary sporting equipment that can be manufactured utilizing the system of FIG. 1.

FIG. 2 illustrates an exemplary embodiment of sporting equipment 12, which can be manufactured using one or both of the additive processes described above. In this embodiment, sporting equipment 12 is protective gear, such as body armor that can be used for motocross, football, hockey, paintball, etc. It is also contemplated that sporting equipment 12 of FIG. 2 could be used for non-sporting activities (e.g., military or police activities), if desired.

As protective gear, sporting equipment 12 may include, among other things, a harness 28, and any number of protection panels 30 that are interconnected and/or positioned on the user via harness 28. Harness 28 and protection panels 30 may be available in a variety of configurations, shapes, and sizes. For example, harness 28 may resemble clothing (e.g., a shirt, a jacket, trousers, gloves, footwear, etc.), a pack (e.g., a back- or front-pack), webbing or straps, etc. Protection panels 30 may include, among other things, a chest panel, a back panel, side panels, a groin panel, a collar panel, a deltoid panel, a shin panel, an elbow panel, etc. that are configured to protect the user from impacts (e.g., from user-ground impacts, from ballistics, from shrapnel, from other sporting equipment, etc.). Protection panels 30 may be separate from harness 28 (e.g., held within pockets of or otherwise adhered to harness 28) or integral with harness 28, as desired.

Harness 28, in addition to positioning and/or interconnecting protection panels 30, may perform other functions. For example, while perhaps not as capable of absorbing direct impacts as protection panels 30, harness 28 may still be capable of providing some level of protection from abrasion, deflected debris, environmental elements, etc. In addition, harness 28 may be configured to allow flexing between connected panels 30, ventilation between panels 30 and the user (e.g., for heating/cooling), and/or biofeedback.

As described above, harness 28 and one or more of protection panels 30 may be integrally formed. When any two more components of sporting equipment 12 are simultaneously manufactured to form a single monolithic structure, some or all of the fibers discharging from head(s) 16 and/or 24 (referring to FIG. 1) may be continuous through each of these components, such that thousands (if not millions) of fibers extend through intersections between the components, thereby creating strong mechanical connections without requiring the use of specialized hardware, glues, and/or heavy fasteners. It should be noted that, although harness 28 and panels 30 have been described above as being fabricated together as a single monolithic structure, one or more of these components could be fabricated separately and later joined (e.g., via chemical and/or mechanical means) to each other.

Each of these components may be formed via any combination of the first and second additive processes described above, and may consist of any number of different fibers (e.g., fibers of different materials, sizes, colors, and/or cross-sectional shapes) overlapping and/or interweaving with each other in any pattern, at any location, and with any desired density. For example, single fibers F or groupings of fibers F may be coated with matrix and strategically discharged as tracks from head 24 (referring to FIG. 1) to create the general structure of sporting equipment 12, while other fibers or groupings of fibers may be interwoven to create hollow tubes that are coated with matrix and strategically discharged as conduits C from head 16. These conduits C may then be used to provide ventilation, cooling, heating, etc. for the user.

In one exemplary embodiment, some of the fibers within the composite material making up one or more portions of sporting equipment 12 have unique characteristics. For example, while a majority of sporting equipment 12 may comprise a structural type fiber $F_s$ (e.g., carbon fibers, fiberglass, or Kevlar fibers), some portions of sporting equipment 12 may include a functional type of fiber $F_f$ (e.g., electrically conductive fibers, optical fibers, shape memory fibers, etc.). The functional type of fibers $F_f$ may be selectively interwoven with the structural type fibers $F_s$ at strategic locations. For example, electrically conductive fibers $F_f$ may be located at high-stress regions (e.g., within protection panels 30) and used as strain gauges to detect loading conditions of sporting equipment 12.

In a similar manner, optical fibers $F_f$ may be located at the same or other high-stress regions, and an energy beam passed therethrough. As these regions flex, the optical fibers $F_f$ may be squeezed and/or closed, thereby generating an optical feedback signal indicative of the flexing. This information may be used to determine an impact location on the user, an impact strength or direction, an impact timing, etc. In some embodiments, a receiving and/or interpreting device (e.g., an interrogator) may be embedded within the sporting equipment 12 to receive, interpret, respond to, and/or remotely transmit the information The electrically conductive fibers $F_f$ and/or the optical fibers $F_f$ may be coated with another material (e.g., insulation, a strength enhancing layer, etc.), if desired. Additionally, other electrical components (e.g., resistors, capacitors, LEDs, switches, batteries, filters, etc.) 32 may be extruded through heads 16, 24 and/or automatically picked-and-placed (e.g., via attachments associated with heads 16 and/or 24) during discharge of the fibers $F_f$. Operation of these components may then be tuned and monitored to identify the user and/or to determine conditions of sporting equipment 12 and/or the user. For example, heart-rate sensors, blood pressure sensors, oxygen sensors, temperature sensors, etc. may be formed from components 32 and placed at strategic locations to provide the biofeedback (e.g., injury status or health) of the user.

The configuration of fibers within harness 28 and/or panels 30 (and/or the location/orientation relationship between harness 28 and panels 30) may be adjustable and/or user-customizable. For example, the material type, fiber size, color, shape, pattern, location, orientation, and/or density may be selectively adjusted to provide a desired performance of sporting equipment 12. These adjustments may be manually selected by an end-user and/or automatically selected based on characteristics of the user (e.g., based on a body scan of the user, a monitored performance of the user, etc.).

As shown in the enlargement of FIG. 2, because the matrix surrounding each fiber may be cured and harden immediately upon discharge, the fibers may not be required to lie in parallel flat layers on top of each other. Accordingly, the fibers making up harness 28 and/or panels 30 may be oriented in any desired direction. This may allow for interlocking of fiber layers and/or for the creation of unique (e.g., strengthening, rigidity-enhancing, flexibility-enhancing, vibration-dampening, impact-resisting) features.

In the exemplary embodiment shown in FIG. 2, the matrix within the composite material making up one or more portions of sporting equipment 12 has unique characteristics. For example, while a majority of harness 28 may comprise a flexible-type matrix $M_f$, some portions of sporting equipment 12 (e.g., protection panels 30) may include another type of matrix $M_p$ (e.g., a pyrolized matrix that provides greater impact resistance and/or impact cushioning). The other type of matrix $M_p$ may be selectively used to coat the fibers at strategic locations.

In some applications, it may be beneficial to fabricate one or more protection panels 30 separate from harness 28, and thereafter integrate the pre-fabricated panels 30 into harness 28. For example, when protection panels 30 are to be pyrolized, panels 30 may first need to be fabricated by system 10 using a pre-ceramic type matrix. Thereafter, panels 30 may need to be heated to temperatures that would otherwise damage the matrixes of harness 28. After the conversion of the pre-ceramic type of matrix within panels 30 to the pyrolized ceramic material, panels 30 may then be embedded within harness 28.

Panels 30 may be embedded within harness 28 in multiple ways. In a first example, after a base layer of harness 28 has been fabricated (i.e., after the associated matrix in the base layer has been cured), panels 30 may be positioned adjacent the base layer, and a subsequent layer of harness 28 may be discharged to lock panels 30 in place. In a second example, harness 28 may be almost completely formed, with only strategic portions of the associated matrix being left uncured. After inserting panels 30 into harness 28, those previously uncured portions may be overlapped, wrapped around, and/or interwoven into panels 30 and thereafter cured. In a final example, pockets may be fabricated within harness 28, into which panels 30 are inserted. The pockets could be fully formed and cured during a first step of the process, or only partially formed and/or partially cured prior to panel insertion. After panel insertion, a follow-up step could be implemented, wherein the pocket is closed and cured.

In one example, a unique matrix may be used for accommodating a separately fabricated panel 30. The unique matrix may be, for example, a "click" or reversible resin (e.g., a Triazolinedione, a covalent-adaptable network, a spatioselective reversible resin, etc.). A reversible resin is a photopolymer having controllable molecularization. Specifically, when a reversible resin is exposed to a first wavelength of light (e.g., about 250 nm), the resin is cured during a phase change from a first state (e.g., a liquid state) to a second state (e.g., a solid state). And when the same resin is subsequently exposed to a second wavelength of light (e.g., about 300 nm), the resin reverses phase (e.g., only partially or completely) back to the first state.

In the separate-panel embodiment described above, the first wavelength of light may be provided by cure enhancer 22 during normal fabrication of harness 28 utilizing a reversible resin as the matrix surrounding the continuous fiber reinforcement. In this same embodiment, the second wavelength of light may be provided (e.g., by cure enhancer 22 or a separate and dedicated deactivator—not shown) to soften the harness and allow for insertion of a pre-fabricated panel 30. Thereafter, harness 28 may again be exposed to the first wavelength of light to cause harness 30 to harden and lock panel 30 in place. For example, a flap or pocket could be fabricated that includes a hinge made using the reversible resin. After properly positioning the pre-fabricated panel 30, the hinge could be softened, and the flap or pocket could be pivoted to a locking position, followed by re-hardening of the hinge.

INDUSTRIAL APPLICABILITY

The disclosed arrangement and design of sporting equipment 12 may be used in connection with any sporting event. Sporting equipment 12 may be light-weight and low-cost, due to a reduction in the number of fasteners required to join the various components to each other. In addition, sporting equipment 12 may be light-weight do to the use of composite materials. High-performance may be provided in the unique ways that particular fibers, resins, and functional components are used and laid out within sporting equipment 12.

It will be apparent to those skilled in the art that various modifications and variations can be made to the disclosed sporting equipment. Other embodiments will be apparent to those skilled in the art from consideration of the specification and practice of the disclosed sporting equipment. For example, although sporting equipment 12 is described above as being fabricated from matrix-wetted reinforcements, it is contemplated that portions (e.g., structurally insignificant areas and/or an outer skin) of sporting equipment 12 may be fabricated from only the matrix, if desired. It is intended that the specification and examples be considered as exemplary only, with a true scope being indicated by the following claims and their equivalents.

What is claimed is:

1. A sporting equipment, comprising:
    a harness configured to be worn on an upper body of a human, the harness having at least a front portion and a back portion and being fabricated from a plurality of fibers; and
    a protective panel at least partially surrounded and supported by the harness, the protective panel being integrally formed from the plurality of fibers of the harness and configured to protect the human from an impact injury,
    wherein the plurality of fibers are continuous from the harness into the protective panel, the plurality of fibers are at least partially coated with a first matrix in the harness and a second matrix in the protective panel, and the first and second matrixes are different.

2. The sporting equipment of claim 1, further including a functional component imbedded within at least one of the harness and the protective panel.

3. The sporting equipment of claim 2, wherein the functional component is configured to generate a signal upon impact of the protective panel.

4. The sporting equipment of claim 2, wherein the functional component is configured to generate a signal indicative of biofeedback associated with a user wearing the harness.

5. The sporting equipment of claim 2, wherein the functional component is at least one of a resistor, a capacitor, an LED, a switch, a battery, a filter, and an interrogator.

6. The sporting equipment of claim 1, wherein at least one of the harness and protective panel are fabricated from a plurality of different types of fibers.

7. The sporting equipment of claim 6, wherein the plurality of different types of fibers includes:
    a structural type of fiber; and
    a functional type of fiber.

8. The sporting equipment of claim 7, wherein the functional type of fiber includes at least one of an electrically conductive fiber, an optical fiber, and a shape memory fiber.

9. The sporting equipment of claim 7, wherein the structural type of fiber includes at least one of an aramid fiber, a carbon fiber, and a glass fiber.

10. The sporting equipment of claim 6, further including a plurality of conduits interwoven with the plurality of different types of fibers.

11. The sporting equipment of claim 10, wherein each of the plurality of conduits are woven from a plurality of fibers.

12. The sporting equipment of claim 1, wherein:
    the first matrix includes a structural type of resin that is stiff after curing; and
    the second matrix includes a functional type of resin that is flexible after curing.

13. The sporting equipment of claim 1, wherein the plurality of fibers overlap in at least one of different directions and different densities.

14. A sporting equipment, comprising:
a harness configured to be worn by a human;
a protective panel operatively supported by the harness and configured to protect the human from an impact injury; and
a functional component disposed in the protective panel, wherein:
the harness and the protective panel are formed from a plurality of fibers;
the plurality of fibers includes a structural type of fiber and a functional type of fiber; and
the functional component is connected between ends of the functional type of fiber.

15. The sporting equipment of claim 14, wherein the functional component is configured to at least one of generate a signal upon impact of the protective plate and generate a signal indicative of biofeedback associated with a user wearing the harness.

16. The sporting equipment of claim 15, wherein the functional type of fiber includes at least one of an electrically conductive fiber, an optical fiber, and a shape memory fiber.

17. A sporting equipment, comprising:
a harness configured to be worn by a human and fabricated from a plurality of fibers coated in a first matrix; and
a protective panel configured to protect the human from an impact injury and integrally formed from the plurality of fibers of the harness, the plurality of fibers in the protective panel being coated in a second matrix different from the first matrix.

18. The sporting equipment of claim 17, further including a functional component imbedded within at least one of the harness and the protective panel and configured to generate a signal upon impact of the protective panel.

19. The sporting equipment of claim 17, wherein:
the protective panel is more impact resistant than the harness; and
the harness and protective panel are integrally fabricated.

20. The sporting equipment of claim 17, wherein:
the protective panel is a first protective panel;
the sporting equipment includes at least a second protective panel integrally formed from the plurality of fibers of the harness; and
the harness is at least one of flexible and ventilated between the first and second protective panels.

* * * * *